(12) United States Patent
Miedema

(10) Patent No.: US 12,246,838 B2
(45) Date of Patent: Mar. 11, 2025

(54) AIRCRAFT CABIN

(71) Applicant: Safran Seats GB Limited, Cwmbran (GB)

(72) Inventor: Jurre Miedema, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 128 days.

(21) Appl. No.: 17/760,659

(22) PCT Filed: Sep. 16, 2020

(86) PCT No.: PCT/GB2020/052233
§ 371 (c)(1),
(2) Date: Mar. 15, 2022

(87) PCT Pub. No.: WO2021/053328
PCT Pub. Date: Mar. 25, 2021

(65) Prior Publication Data
US 2022/0332420 A1 Oct. 20, 2022

(30) Foreign Application Priority Data
Sep. 20, 2019 (GB) ................................. 1913614

(51) Int. Cl.
*B64D 11/06* (2006.01)
(52) U.S. Cl.
CPC ...... *B64D 11/0601* (2014.12); *B64D 11/0602* (2014.12)
(58) Field of Classification Search
CPC ............ B64D 11/0601; B64D 11/0602; B64D 11/0604; B64D 11/0606
See application file for complete search history.

(56) References Cited

U.S. PATENT DOCUMENTS 8,196,864 B2 * 6/2012 Ruiter .................. B64D 11/06
244/118.6
11,319,072 B2 * 5/2022 Henshaw ........... B64D 11/0601
(Continued)

FOREIGN PATENT DOCUMENTS

DE 102010019192 A1 * 11/2011 ............. B64D 11/06
EP 2974961 A1 1/2016
(Continued)

OTHER PUBLICATIONS

International Patent Application No. PCT/GB2020/052233, International Search Report and Written Opinion, dated Dec. 18, 2020.
(Continued)

*Primary Examiner* — Magdalena Topolski
*Assistant Examiner* — Anna L. Gordon
(74) *Attorney, Agent, or Firm* — Kilpatrick Townsend & Stockton LLP

(57) ABSTRACT

An aircraft cabin (100) is disclosed. The aircraft cabin (100) comprises a plurality of pairs of seat units (120) positioned along an aisle (101). Each aisle seat unit (122A) comprises an aisle seat (125A) and an aisle footwell (126A) and each non-aisle seat unit (123A) comprises a non-aisle seat (127A) and a non-aisle footwell (128A). The aisle seat unit (122A) and non-aisle seat unit (123A) are positioned with respect to one another such that the aisle seat (125A) faces towards a first end of the cabin (100) and has direct access to the aisle (101), the non-aisle seat (127A) faces towards a second, opposite end of the cabin (100). The aisle seat unit (122A) is oriented at an angle with respect to the non-aisle seat unit (123A) to provide the non-aisle seat unit (123A) with an aisle access path (129A) between the non-aisle seat (127A) and the aisle footwell (126A). The width of the non-aisle footwell (128A) is less than the width of the non-aisle seat (Continued)

(127A) and the aisle seat (125A) is positioned directly adjacent the non-aisle footwell (128A).

12 Claims, 4 Drawing Sheets

(56) References Cited

U.S. PATENT DOCUMENTS

| | | |
|---|---|---|
| 2017/0240283 A1 | 8/2017 | Dowty |
| 2017/0327232 A1* | 11/2017 | Morgan ............ B64D 11/0606 |
| 2017/0369171 A1 | 12/2017 | Eakins |
| 2018/0281959 A1 | 10/2018 | Braca et al. |
| 2019/0176991 A1* | 6/2019 | Braca ....................... B60N 2/34 |

FOREIGN PATENT DOCUMENTS

| | | |
|---|---|---|
| WO | 2011141134 A1 | 11/2011 |
| WO | 2014049362 A1 | 4/2014 |
| WO | 2014125046 A1 | 8/2014 |
| WO | 2015008082 A2 | 1/2015 |
| WO | 2018078376 A1 | 5/2018 |
| WO | WO-2021032723 A1 * | 2/2021 ......... B64D 11/0601 |

OTHER PUBLICATIONS

United Kingdom Patent Application No. 1913614.2, Search Report, dated Feb. 26, 2020.

\* cited by examiner

AIRCRAFT CABIN

CROSS-REFERENCE TO RELATED APPLICATIONS

This application is the United States national stage entry of International Patent Application PCT/GB2020/052233, filed on Sep. 16, 2020 and titled "Aircraft Cabin," which claims priority to United Kingdom Patent Application No. 1913614.2, filed on Sep. 20, 2019 and titled "Aircraft Cabin," both of which are hereby incorporated by reference in their entireties.

FIELD OF THE INVENTION

The present invention relates to an aircraft cabin, and to a kit of parts for forming such an aircraft cabin.

BACKGROUND OF THE INVENTION

Business class seating generally aims to provide aircraft passengers with maximum comfort and privacy. However, the design of aircraft passenger seat units for business class seating is constrained by the limited availability of space within an aircraft cabin.

WO2014/049362A1 and WO2011/141134A1 both disclose examples of aircraft cabin arrangements in which non-aisle seat units that are situated away from the cabin aisles are provided with aisle access paths that do not pass through any neighbouring seat units. A particular benefit of this type of configuration is that a passenger of a non-aisle seat unit is able to access the aisle without disturbing a passenger of the neighbouring aisle seat unit.

Increasing the packing density of seat units is highly desirable for airlines due to increased revenues that can result from the increased number of paying business class passengers that can be contained within a given aircraft cabin space.

Business class seats that are configurable to a lie-flat bed-mode configuration are desirable for medium range and long range missions. Wide-body aircraft have traditionally been used for such missions. However, narrow-body aircraft requiring a single-aisle cabin layout are now also being used for medium range missions of up to approximately 5 hours. As such, high density business class cabin arrangements are desirable for narrow-body aircraft as well as for wide-body aircraft.

The present invention seeks to mitigate the above-mentioned problems. Alternatively or additionally, the present invention seeks to provide an improved aircraft cabin.

SUMMARY OF THE INVENTION

The present invention provides, according to a first aspect, an aircraft cabin comprising a first aisle and a first plurality of pairs of seat units positioned along the first aisle on a first side of the first aisle, each pair of seat units comprising a non-aisle seat unit and an aisle seat unit. The aisle seat unit comprises an aisle seat and an aisle footwell and the non-aisle seat unit comprises a non-aisle seat and a non-aisle footwell. The aisle seat unit and non-aisle seat unit are positioned with respect to one another such that the aisle seat faces towards a first end of the cabin and has direct access to the aisle, the non-aisle seat faces towards a second, opposite end of the cabin, and the aisle seat unit is oriented at an angle with respect to the non-aisle seat unit to provide the non-aisle seat unit with an aisle access path between the non-aisle seat and the aisle footwell. The width of the non-aisle footwell is less than the width of the non-aisle seat and the aisle seat is positioned directly adjacent the non-aisle footwell.

The present invention provides a particularly space-efficient cabin arrangement where an aircraft cabin comprises pairs of aisle and non-aisle seat units configured to create an aisle access path for the non-aisle seat units. The seat units of each pair are arranged head-to-toe, with their respective seats facing in opposite directions and being spaced apart along the length of the cabin so that the aisle seat is located at substantially the same position along the length as the aircraft cabin as the non-aisle footwell and vice versa. The arrangement recognises that because the footwell of the a seat unit can be narrower than its seat, positioning the aisle seat directly adjacent the non-aisle footwell, where the non-aisle seat unit is at its narrowest, allows for the overall width of a pair of seat units to be reduced. This particular arrangement also results in the staggering of the aisle and non-aisle seat units being reduced, which results in the overall pitch of a pair of the seat units being reduced. The invention therefore provides a cabin arrangement in which the usage of space in both the length and width dimensions of the cabin is improved. Furthermore, because the non-aisle seat unit is entered via the aisle access path from behind the non-aisle seat, when sitting in the non-aisle seat there is no direct line of sight from the non-aisle seat into the aisle. Such a configuration therefore results in enhanced privacy for the passenger of the non-aisle seat.

The aisle may run along a length of the cabin. The cabin may comprise a longitudinal axis. The longitudinal axis of the cabin may run centrally along the length of the cabin. The aisle may be substantially parallel to the longitudinal axis of the cabin. The aisle may be a first aisle. The aisle may run centrally along the length of the cabin. Where the aircraft cabin comprises two aisles the aisle may be a port aisle or a starboard aisle.

The first end of the cabin may be one of a fore or aft of the cabin. The second end of the cabin may be the other of the fore or aft of the cabin. Each pair of seat units may be oriented in the same direction such that the aisle seats of each pair all face towards the first end of the cabin and such that the non-aisle seats of each pair face towards the second end of the cabin. Alternatively, the orientation of one or more of the pairs of seat units may be reversed relative to one or more of the other pairs of seat units in the first plurality. For example, for a given pair of seat units the aisle seat may face towards the fore of the cabin and the non-aisle seat unit may face towards the aft of the cabin whereas for another pair of seat units in the first plurality the aisle seat may face towards the aft of the cabin and the non-aisle seat unit may face towards the fore of the cabin.

The cabin may comprise a longitudinal axis that runs along the length of the cabin. The first aisle may be substantially parallel to the longitudinal axis of the cabin. The aisle seat unit may be oriented at an angle with respect to a longitudinal axis of the aircraft cabin. The non-aisle footwell and aisle seat may be located at substantially the same position on the longitudinal axis of the aircraft cabin. The aisle seat may be juxtaposed the non-aisle footwell.

The non-aisle seat unit may be oriented at an angle to the longitudinal axis of the aircraft cabin. One of the factors determining the pitch of an aircraft seat unit is the length of the aircraft seat when in its longest configuration. This may be, for example, when the seat is in a lie flat configuration. Thus, when designing a seat unit, the pitch of a seat unit may be at a maximum where the seat faces in the direction of travel, substantially parallel to the longitudinal axis of the aircraft cabin. A further reduction in pitch of a given pair of seat units can therefore be achieved by angling the non-aisle seat unit.

The aisle seat may face towards the first aisle. The aisle seat may face in a direction defining an aisle seat unit axis. The aisle seat unit axis may be oriented at an aisle seat unit angle of between 16 and 20 degrees with respect to the longitudinal axis of the aircraft cabin. The non-aisle seat may face towards the first aisle. The non-aisle seat may face in a direction defining a non-aisle seat unit axis. The non-aisle seat unit axis may be oriented at a non-aisle seat unit angle of between 2 and 9 degrees with respect to the longitudinal axis of the aircraft cabin. The non-aisle seat unit axis may be oriented at an angle of between 19 and 25 degrees with respect to the aisle seat unit axis.

The aisle seat unit and non-aisle seat unit may both overlap a seat unit pair axis. The aisle seat unit and non-aisle seat unit of each pair of the first plurality may both overlap a single seat unit pair axis. The seat unit pair axis may be substantially parallel to the longitudinal axis of the aircraft cabin.

A seat unit pair axis may pass through both the non-aisle seat and the aisle seat of a pair of seat units of the first plurality of pairs of seat units. A seat unit pair axis may pass through both the non-aisle seat and the aisle seat of each pair of seat units of the first plurality of pairs of seat units. The seat unit pair axis may be parallel with longitudinal axis of aircraft cabin. A section of a seat unit pair axis may pass through a pair of seat units. The length of the section may be equal to the pitch of the pair of seat units. The non-aisle seat unit may overlap the section of the seat unit pair axis along between 50% and 90% of the length of the section. The non-aisle seat unit may overlap the section of the seat unit pair axis along between 60% and 80% of the length of the section, or more preferably between 70% and 80% of the length of the section. The aisle seat unit may overlap the section of the seat unit pair axis along between 50% and 10% of the length of the section. The aisle seat unit may overlap the section of the seat unit pair axis along between 40% and 20% of the length of the section, or more preferably between 30% and 20% of the length of the section.

It is well known to angle seats with respect to the longitudinal axis of an aircraft to reduce the overall pitch of a seat unit. However, angling the seats in this way increases the space used across the width of the cabin. This preferred arrangement recognises that because the seat units are oriented at an angle with respect to one another, the packing efficiency across the width of the aircraft can be improved by arranging the seat units such that their seats are intercepted by or overlap with a seat unit pair axis.

Optionally, the aircraft cabin further comprises a second plurality of pairs of seat units positioned along the first aisle on a second, opposite side of the first aisle. The second plurality of seat units may have any of the features of the first plurality of seat units. The second plurality of pairs may be substantially identical to the first plurality of pairs. The second plurality of pairs may be a mirror image of the first plurality of pairs. The second plurality of pairs may be arranged symmetrically with the first plurality of pairs about the longitudinal axis of the aircraft cabin. The second plurality of pairs may be arranged symmetrically with the first plurality of pairs about the aisle. The second plurality of pairs may be rotated 180 degrees with respect to the first plurality of pairs such that for each pair of the second plurality, the aisle seat faces towards the second end of the cabin and the non-aisle seat faces towards the second end of the cabin.

Optionally, the aircraft cabin further comprises a second aisle, wherein the first aisle and the second aisle are positioned between the first plurality of pairs of seat units and the second plurality of pairs of seat units. The second aisle may run along the length of the cabin, substantially parallel to the first aisle. The second aisle may be substantially parallel with a longitudinal axis of the aircraft cabin.

Optionally, a third plurality of pairs of seat units is positioned between the first aisle and the second aisle, the third plurality of pairs of seat units being positioned along one of the first aisle or second aisles, each pair of seat units comprising a non-aisle seat unit and an aisle seat unit. The aisle seat unit comprises an aisle seat and an aisle footwell and the non-aisle seat unit comprises a non-aisle seat and a non-aisle footwell, wherein the width of the non-aisle footwell is less than the width of the non-aisle seat. The aisle seat unit and non-aisle seat unit are positioned with respect to one another such that the aisle seat faces towards a first end of the cabin and has direct access to the one of the first or second aisles, the non-aisle seat faces towards a second, opposite end of the cabin, the aisle seat is positioned directly adjacent the non-aisle footwell, and the aisle seat unit is oriented at an angle with respect to the non-aisle seat unit to provide the non-aisle seat unit with an aisle access path between the non-aisle seat and the aisle footwell.

The third plurality of seat units may have any of the features of the first plurality of seat units. The third plurality of seat units may be substantially identical to the first plurality of seat units. The third plurality of seat units may only differ from the first plurality of seat units in that the aisle seat unit angle and/or non-aisle seat unit angle may differ from those angles of the first plurality of seat units.

An aisle seat unit angle of the third plurality of seat units may be different to an aisle seat unit angle of the first plurality of seat units. A non-aisle seat unit angle of the third plurality of seat units may be different to a non-aisle seat unit angle of the first plurality of seat units. The third plurality of seat units may comprise a plurality of sets of three seat units, each set of seat units comprising a first seat unit corresponding to the aisle seat the pair of seat units, a second seat unit corresponding to the non-aisle seat of the pair of seat units, and a third seat unit. The third seat unit may be an aisle seat unit comprising an aisle seat and an aisle footwell. The third seat unit may be positioned with respect to the first and second seat units such that the aisle seat of the third seat unit faces towards a first end of the cabin and has direct access to the other of the first and second aisles, the aisle seat of the third seat unit is positioned directly adjacent the non-aisle footwell of the second seat unit, and the aisle footwell of the third seat unit is positioned directly adjacent the non-aisle seat of the second seat unit.

The third seat unit may be configured head-to-toe with the non-aisle seat unit of the pair of seat units. The footwell of the non-aisle seat unit may be directly adjacent the seat of the third seat unit and vice versa. The footwell of the non-aisle seat unit may be juxtaposed the seat of the third seat unit and vice versa. As an aisle side access path is provided between the aisle seat unit and non-aisle seat of the pair of seat units, there is no need to provide a further aisle access path, so the non-aisle seat unit and the third seat unit can be arranged in a space-efficient manner such that their respective seats and footwells are directly adjacent to one another. Where the non-aisle seat unit is oriented at an angle to a longitudinal axis of the aircraft cabin, the third seat unit may also be oriented at an angle to the longitudinal axis of the aircraft cabin. The aisle seat of the third seat unit may face in a direction defining a third seat unit axis. The third seat unit axis may be oriented at an angle of between 5 and 8 degrees to a longitudinal axis of the aircraft cabin.

The present invention provides, according to a second aspect, a kit of parts suitable for forming an aircraft cabin according to any preceding claim.

It will of course be appreciated that features described in relation to one aspect of the present invention may be incorporated into other aspects of the present invention. For example, the kit of parts of the invention may incorporate any of the features described with reference to the aircraft cabin of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
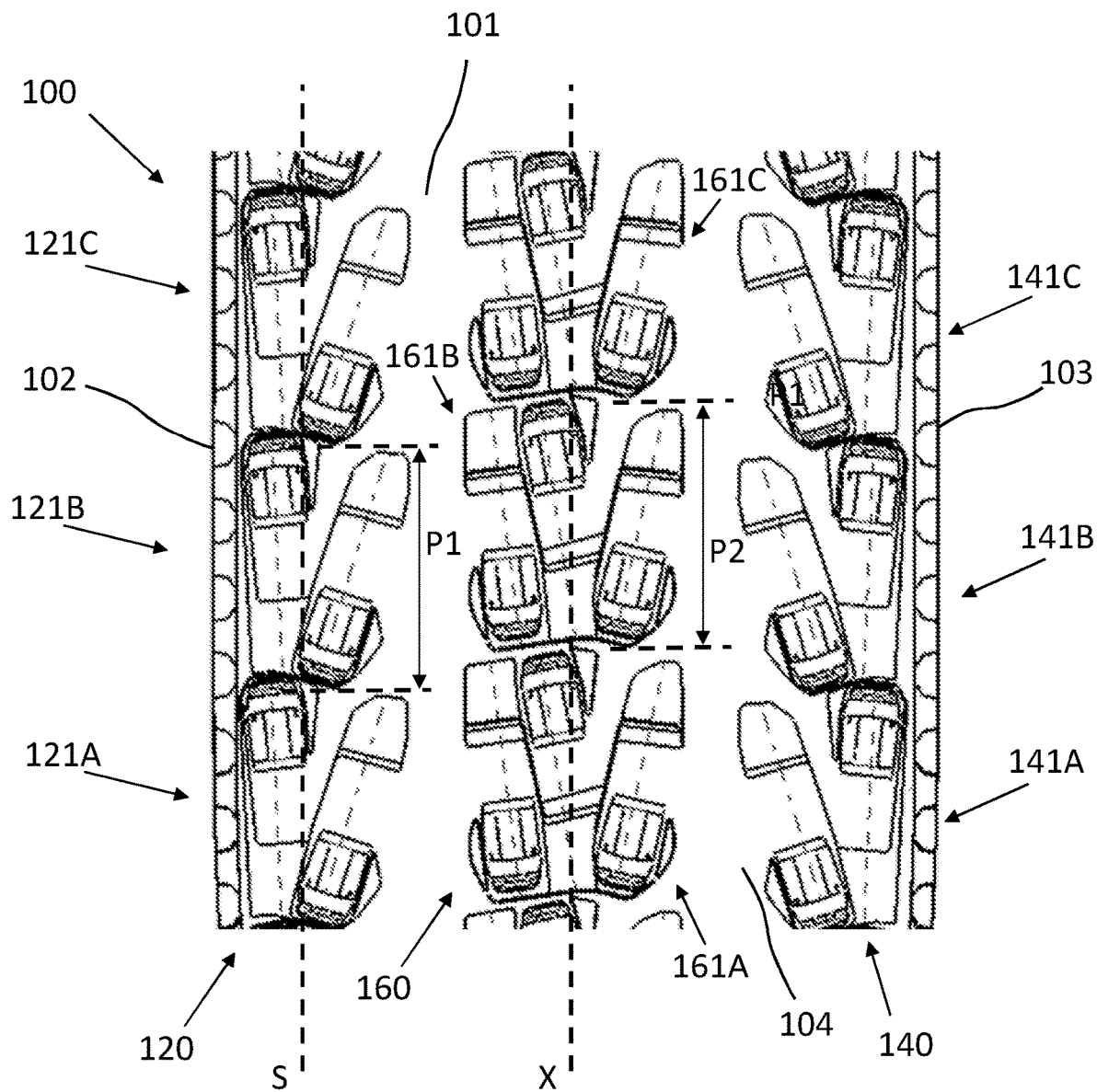
FIG. 1 is a plan view of an aircraft cabin according to a first embodiment of the invention.

A plan view of an aircraft cabin 100 according to an embodiment of the invention is shown in FIG. 1. The cabin 100 is that of a wide-body aircraft and comprises a starboard wall 102, which is shown on the left-hand side of the FIG. 1, and a port wall 103, which is shown on the right-hand side of FIG. 1. The fore of the aircraft would therefore be located below the image shown in FIG. 1 and the aft of the aircraft would therefore be located above the image shown in FIG. 1. The cabin 100 comprises a starboard plurality of pairs of seat seats 120 arranged in a column along the starboard side of the cabin 100, between the starboard wall 102 of the cabin 100 and a starboard aisle 101, a port plurality of pairs of seat units 140 arranged in a column along the port side of the cabin 100, between the port wall 103 of the aircraft cabin 100 and a port aisle 104, and an inboard plurality of seat units 160 arranged in a column centrally along the length of the cabin 100 between the port and starboard aisles 101, 104. The inboard plurality of seat units 160 comprises a plurality of sets of three seat units 161A, 161B, 161C arranged in a column along the length of the cabin 100.

The port and starboard aisles 101, 104 run the length of the cabin 100 and are oriented substantially parallel to a longitudinal axis X of the aircraft cabin 100 which runs centrally along the length the cabin 100. As can be seen in FIG. 1, the starboard plurality of pairs of seat units 120 and the port plurality of pairs seat units 140 are arranged symmetrically about the longitudinal axis X and are therefore substantially identical mirror images of one another whereas the each set of three seat units 161A, 161B, 161C of the inboard plurality of seat units 160 is arranged asymmetrically about the longitudinal axis X of the cabin 100.

Because each of the starboard pairs of seat units 121A, 121B, 121C are arranged in substantially the same way as each of the port pairs of seat units 141A, 141B, 141C, the arrangement of the pairs of seat units will now be described with reference only to the single pair of starboard seat units 121A that is depicted in isolation in FIG. 2. The pair of seat units 121A consists of an aisle seat unit 122A comprising an aisle seat 125A and an aisle footwell 126A and a non-aisle seat unit 123A comprising a non-aisle seat 127A and a non-aisle footwell 128A. The seats are configurable between an upright sitting configuration and a lie-flat bed mode configuration. In the lie-flat configuration a leg rest of the seat extends into its respective footwell. The aisle seat unit 122A is situated immediately adjacent the aisle 101 with direct access to the aisle 101, and the non-aisle seat unit 123A is situated immediately adjacent the starboard wall 102 of the aircraft cabin 100. The aisle seat unit 122A is therefore positioned between the non-aisle seat unit 123A and the starboard aisle 101.

The aisle seat unit 122A and non-aisle seat unit 123A of the pair 121A are situated side-by-side in a "head-to-toe" configuration. Configured as such, the seats of the pair of seat units are spaced apart along the longitudinal axis X of the aircraft cabin 100 and face in substantially opposite directions, with the aisle seat 125A facing towards the aft of the cabin 100 and the non-aisle seat 127A facing towards the fore of the cabin 100. The non-aisle footwell 128A is located at substantially the same position along the longitudinal axis X as the aisle seat 125A and the aisle footwell 126A is located at substantially the same position along the longitudinal axis X as the non-aisle seat 127A.

The pitch of a seat unit is the distance along the longitudinal axis X of the aircraft cabin 100 between a given point on a seat unit and the corresponding point the immediately adjacent seat unit situated to the front or to the rear. In order to reduce the pitch of the pairs of seat units 120, the both the aisle and non-aisle seat units 122A, 123A are oriented at an angle to the longitudinal axis X of the aircraft cabin 100. The non-aisle seat 127A faces in a direction defining an non-aisle seat unit axis Y2 which is oriented at an non-aisle seat unit angle $\alpha 2$ of 2.5 degrees to the longitudinal axis X of the cabin 100. The aisle seat 125A faces in a direction defining an aisle seat unit axis Y1 which is oriented at an aisle seat unit angle $\alpha 1$ of 17.1 degrees to the longitudinal axis of the cabin 100. The angle between the aisle seat unit axis and non-aisle seat unit axis is therefore 19.6 degrees. Such an arrangement results in an outboard seat unit pitch P1 of 201 centimetres.

The aisle seat unit 122A is positioned such that the aisle seat 125A is directly adjacent the non-aisle footwell 128A and, due to the angle between the seat units, such that the aisle footwell 126A is spaced apart from the non-aisle seat 127A. The gap between the aisle footwell 126A and the non-aisle seat 127A provides an aisle access path 129A defining a passenger access path axis Y3 that is substantially parallel with the aisle seat axis Y1. A passenger of the non-aisle seat unit 123A can therefore access the aisle 101 without passing through the aisle seat unit 122A. Furthermore, because the non-aisle seat unit 123A is entered from behind the non-aisle seat 127A via the access path 129A, when sitting in the non-aisle seat 127A there is no direct line of sight from the non-aisle seat 127A into the aisle 101. Such a configuration therefore results in enhanced privacy for the passenger of the non-aisle seat unit 123A.

The seat units 121A, 122A are angled with respect to the longitudinal axis X of the aircraft cabin 100 in order to reduce their pitch P1. However, rotating the seat units 122A, 123A in this way increases the space occupied by the seat units 122A, 123A across the width of the cabin 100, the width of the cabin 100 being measured substantially perpendicular to the longitudinal axis X. In order to efficiently use the space available across the width of the aircraft cabin 100, the arrangement of the aisle and non-aisle seat units 122A, 123A of each pair takes advantage of the fact that, while the width of the non-aisle seat unit is dictated by the width of the W1 non-aisle seat 127A at the seat-end of the seat unit, the non-aisle footwell 128A can be made with a smaller width W2 than the non-aisle seat 127A so that the non-aisle seat unit 123A can be made narrower at its footwell end.

Figure 2:
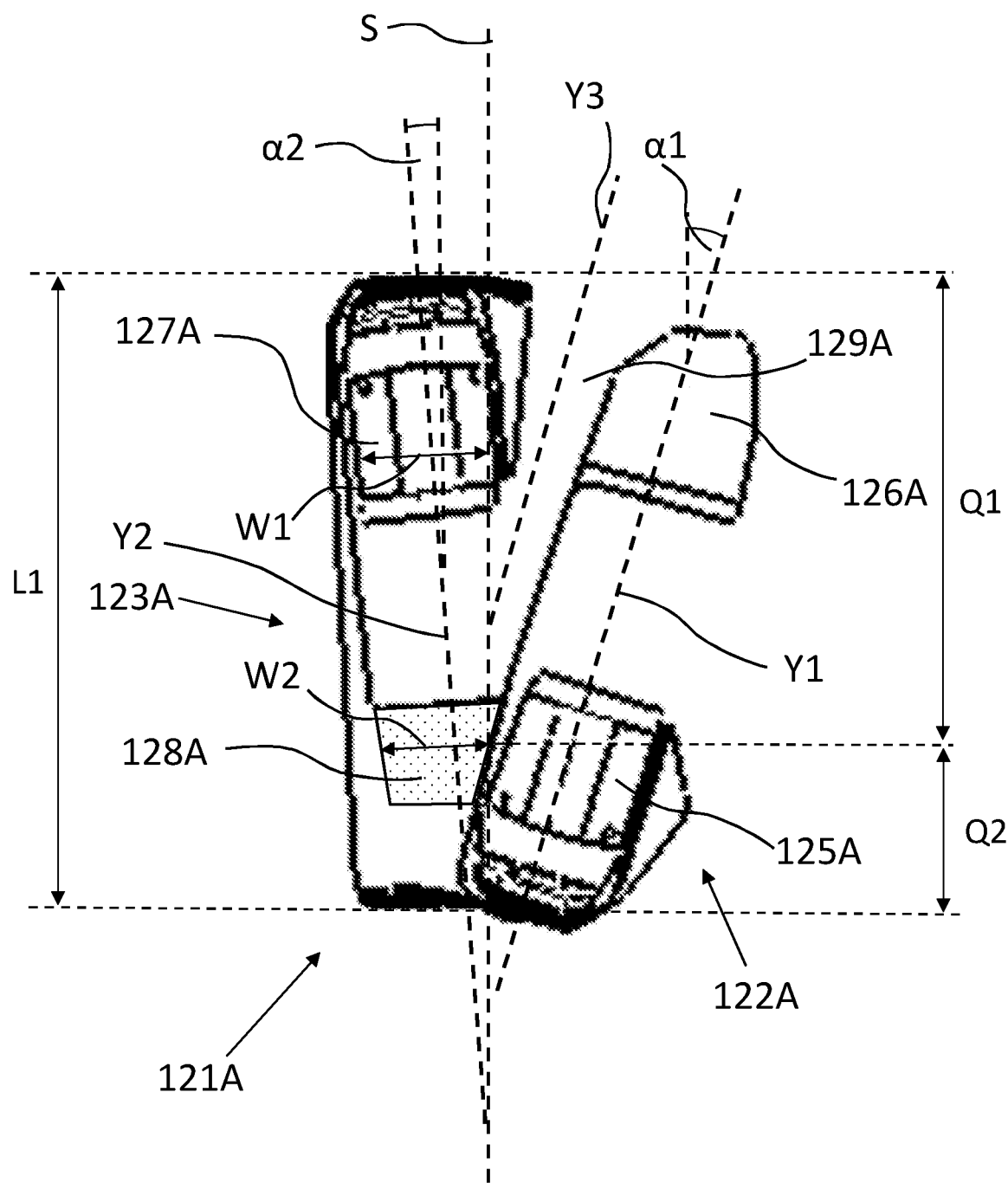
FIG. 2 is a plan view of a pair of outboard seat units from the aircraft cabin according to the first embodiment of the invention.

As can be seen in FIG. 2, the non-aisle seat unit 123A is at its narrowest at its footwell end, where the width of the seat unit is dictated by the width W2 of the non-aisle footwell 128A. In order to reduce the combined width of the aisle and non-aisle seat units 122A, 123A, the aisle seat 125A is placed directly adjacent the non-aisle footwell 128A. So while the seat units 122A, 123A have been rotated away from the longitudinal axis X of the cabin 100 to reduce the pitch P1 of the seat units, the resulting increase in width of the pair of seat units has been mitigated by moving the aisle seat 125A directly adjacent to the non-aisle footwell 128A, which corresponds to the narrowest part of the non-aisle seat unit 123A. In this configuration, both the aisle seat unit 122A and the non-aisle seat unit 123A overlap a seat unit pair axis S, which, in this embodiment of the invention, is simply a straight line drawn through the cabin 100 parallel with the longitudinal axis X of the cabin 100. As can be seen in FIG. 2, a section of the seat unit pair axis S of length L1 passes through the pair of seat units 121A, the length L1 being equal to the pitch P1 of the pair of seat units 121A. The non-aisle seat unit 123A overlaps the section of length L1 along a length Q1 of the section, which is approximately equal to 75% of the length L1. Similarly, the aisle seat unit 122A overlaps the section of length L1 along a length Q2 of the section, which is approximately equal to 25% of the length L1. In this configuration the seat unit pair axis S also passes through both the aisle seat 125A and the non-aisle seat 127A.

Figure 3:
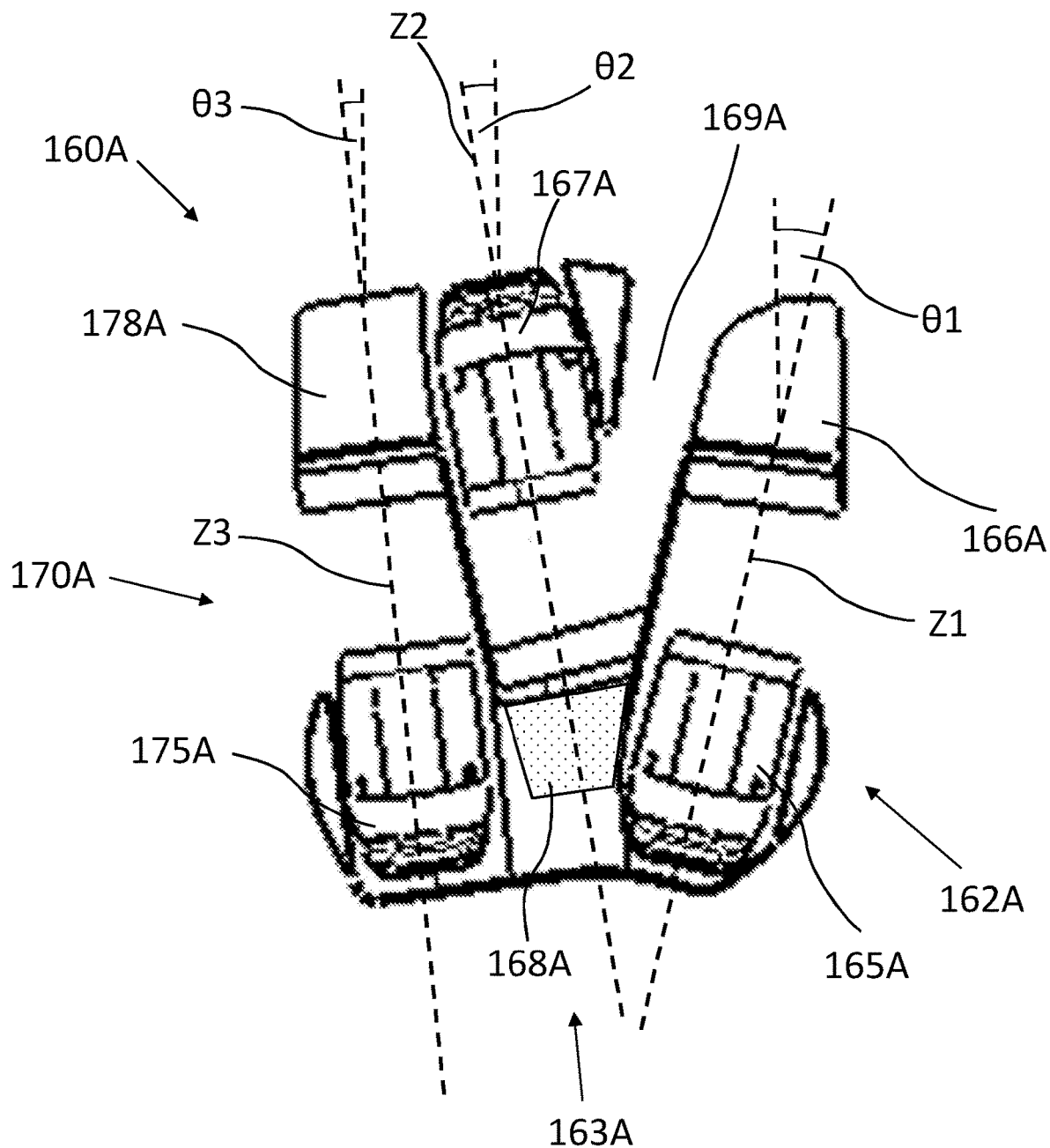
FIG. 3 is a plan view of a set of three inboard seat units from the aircraft cabin according to the first embodiment of the invention.

A single set of three seat units 161A from the inboard plurality of seat units 160 is shown in isolation in FIG. 3. As can be seen, the set of three seat units 161A comprises a port aisle seat unit 162A situated directly adjacent to the port aisle 104, a starboard aisle seat unit 170A situated directly adjacent to the starboard aisle 101, and a central non-aisle seat unit 163A between the port aisle seat unit 162A and the second non-aisle seat unit. The central non-aisle seat unit 163A and the port aisle seat unit 162A form a pair of seat units that are configured in substantially the same way as the pair of seat units 120A as described above with respect to the first outboard plurality of seat units 120. In FIG. 3, features that the central non-aisle seat unit 163A and the port aisle seat unit 162A have in common with the pair of seat units 120A shown in FIG. 2 have therefore been numbered with corresponding reference numerals but having the prefix "16" instead of "12". For example, the pair of starboard seat units 121A comprises an aisle seat footwell 126A whereas the pair of seat units formed by central non-aisle seat unit 163A and the port aisle seat unit 162A comprises a port aisle footwell 166A.

As with the outboard pluralities of pairs of seat units, the central non-aisle seat unit 163A and the port aisle seat unit 162A are arranged "head-to-toe", with the port aisle seat 165A facing towards the aft of the cabin 100 and the central non-aisle seat 167A facing towards the fore of the cabin 100 so that the central non-aisle footwell 128A is located at substantially the same position along the longitudinal axis X as the port aisle seat 165A and vice versa. However, the arrangement of the central non-aisle seat unit 163A and the port aisle seat unit 162A differs from the outboard pluralities of pairs of seat units 120, 140 in that the port aisle seat unit 162A is oriented at a port aisle seat unit angle θ1 of 12.1 degrees to the longitudinal axis of the cabin 100 and the central non-aisle seat unit 163A is oriented at an angle θ2 of 8.6 degrees to the longitudinal axis of the aircraft cabin 100. The angle between the port aisle seat unit axis Z1 and central non-aisle seat unit axis Z2 is therefore 20.7 degrees.

The starboard aisle seat unit 170A is configured "head-to-toe" with the central non-aisle seat unit 163A so that the starboard aisle seat unit 170A faces in a direction towards the aft of the aircraft and the footwell 168A of the central non-aisle seat unit 163A is located at substantially the same position along the longitudinal axis X as the starboard aisle seat 175A and vice versa. Because an aisle access path 169A for the central non-aisle seat 167A has been provided between central non-aisle seat 167A and the port aisle footwell 166A, the footwell 178A of the starboard aisle seat unit 170A is positioned directly adjacent to the central non-aisle seat 167A, and the footwell of the central non-aisle seat 167A unit 163A is positioned directly adjacent to the seat of the starboard aisle seat unit 170A in order to efficiently use the space available across the width of the aircraft cabin 100. Arranged as such, the starboard aisle seat 175A faces in a direction defining a starboard aisle seat axis Z3 that is oriented at an angle θ3 of 7.2 degrees with respect to the longitudinal axis of the aircraft cabin 100. Configured as such the pitch P2 of a set of three seat units 161A from the inboard plurality of seat units 160 is 205 centimetres.

Figure 4:
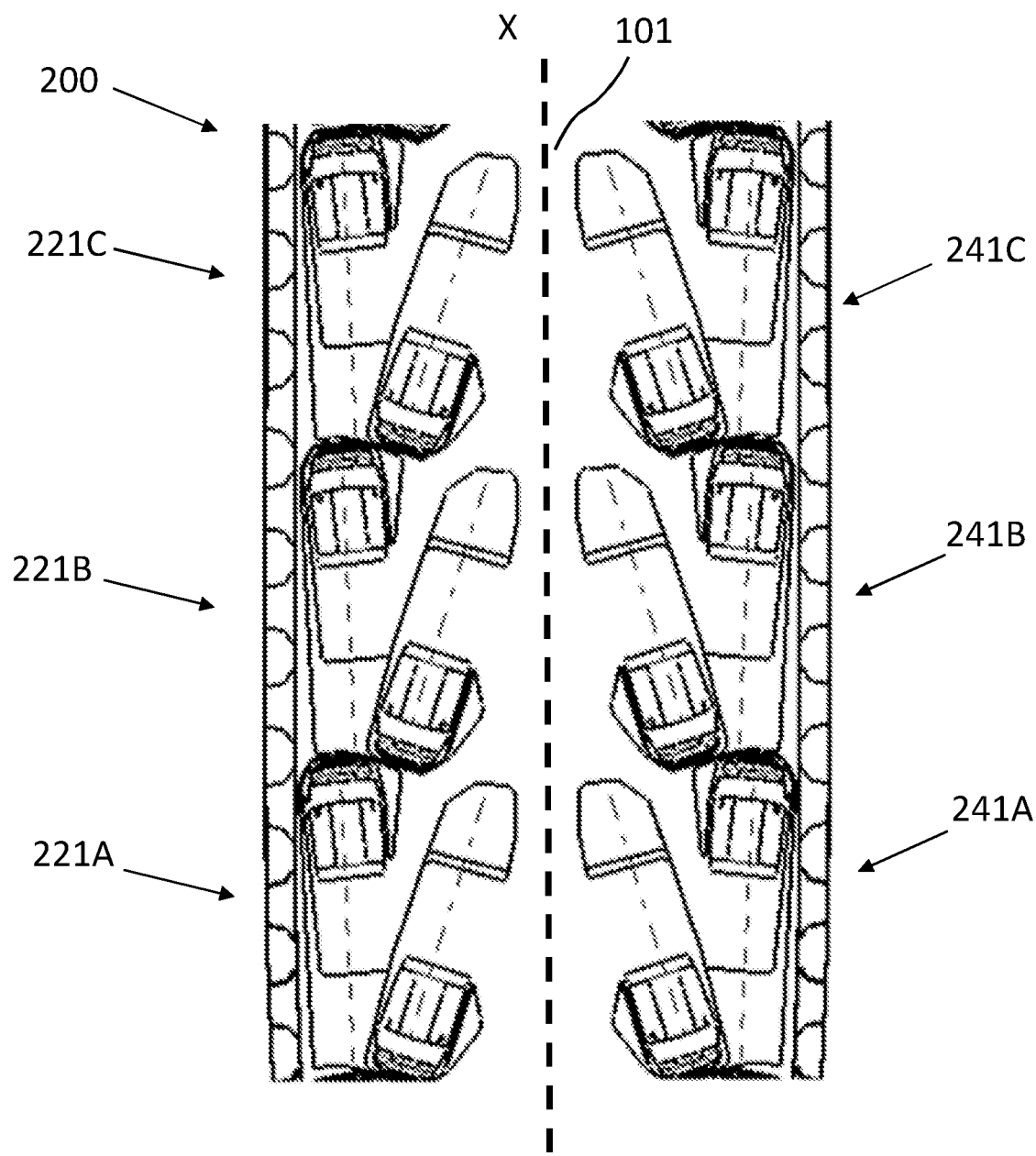
FIG. 4 is a plan view of an aircraft cabin according to a second embodiment of the invention.

A plan view of an aircraft cabin 200 according to a second embodiment of the invention is shown in FIG. 4. The cabin 200 is that of a narrow-body aircraft and comprises a starboard plurality of pairs of seat units 221A, 221B, 221C arranged along a starboard side of the cabin 200 and a port plurality of pairs of seat units 241A, 241B, 241C arranged along a second, opposite side of the cabin 200. The cabin 200 has a single aisle 201 that runs the length of the cabin 200 between the pluralities of pairs of seat units 220, 240. The outboard seat units 221A, 221B, 221C, 241A, 241B, 241C are substantially identical to the respective starboard and port pairs of seat units 121A, 121B, 121C, 141A, 141B, 141C of the wide-body aircraft cabin 100 according to the first embodiment of the invention and described with reference to FIG. 1 and FIG. 2.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

An aircraft cabin according to a third embodiment of the invention is substantially identical to the aircraft cabin according to the first embodiment of the invention. However, the orientation of the seat units is reversed such that the non-aisle seats face towards the aft of the cabin and the aisle seats face towards the fore of the cabin. This arrangement is equivalent to that shown in FIG. 1 but with the port wall on the left-hand side of the figure and the starboard wall on the right-hand side of the figure so that the fore of the aircraft would be located above the figure and the aft of the aircraft would be located below the figure.

An aircraft cabin according to a fourth embodiment of the invention is substantially identical to the aircraft cabin according to the first embodiment of the invention. However, the orientation of the seat units of the inboard plurality of seat units is reversed such that the port and starboard aisle seats face towards the fore of the cabin and the central non-aisle seats face towards the aft of the cabin.

An aircraft cabin according to a fifth embodiment of the invention is substantially identical to the aircraft cabin according to the second embodiment of the invention. However, the orientation of the starboard seat units is reversed such that while, for the port seat units, the aisle seats face towards the aft of the cabin and the non-aisle seats face towards the fore of the cabin, for the starboard seat units the non-aisle seats face towards the aft of the cabin and the aisle seats face towards the fore of the cabin.

An aircraft cabin according to a sixth embodiment of the invention is substantially identical to the aircraft cabin according to the second embodiment of the invention. However, the orientation of the pairs of seat units alternates from pair to pair along the length of the cabin such that while, for a given pair, the aisle seats face towards the aft of the cabin and the non-aisle seats face towards the fore of the cabin, the seat units of the pair situated immediately forward or aft of the given pair are oriented such that the aisle seats face towards the fore of the cabin and the non-aisle seats face towards the aft of the cabin.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft cabin comprising a first aisle and a first plurality of pairs of seat units positioned along the first aisle on a first side of the first aisle, each pair of seat units comprising a non-aisle seat unit and an aisle seat unit,
   wherein the aisle seat unit comprises an aisle seat and an aisle footwell and the non-aisle seat unit comprises a non-aisle seat and a non-aisle footwell, a width of the non-aisle footwell being less than a width of the non-aisle seat, and wherein the aisle seat unit and non-aisle seat unit are positioned with respect to one another such that:
   the aisle seat faces towards a first end of the cabin and has direct access to the aisle,
   the non-aisle seat faces towards a second, opposite end of the cabin,
   the aisle seat faces in a direction defining an aisle seat unit axis and the non-aisle seat faces in a direction defining a non-aisle seat unit axis, wherein the non-aisle seat unit axis is oriented at an angle of between 19 and 25 degrees with respect to the aisle seat unit axis,
   the non-aisle seat unit axis is oriented at an angle of between 2 and 9 degrees with respect to a longitudinal axis of the aircraft cabin such that the non-aisle seat faces towards the first aisle,
   the non-aisle seat and the aisle footwell are spaced apart along a transverse axis of the aircraft cabin to provide the non-aisle seat unit with an aisle access path between the non-aisle seat and the aisle footwell, the transverse axis of the aircraft cabin being oriented perpendicular to the longitudinal axis,
   the aisle seat is positioned adjacent to the non-aisle footwell along the transverse axis of the aircraft cabin such that no access path is provided between the aisle seat and the non-aisle footwell, and
   a position of a seat pan of the aisle seat along the longitudinal axis of the aircraft cabin overlaps with a position of the non-aisle footwell along the longitudinal axis of the aircraft cabin.

2. The aircraft cabin according to claim 1, wherein the aisle seat unit axis is oriented at an aisle seat unit angle of between 16 and 20 degrees with respect to the longitudinal axis of the aircraft cabin.

3. The aircraft cabin according to claim 1, wherein a seat unit pair axis passes through both the non-aisle seat and aisle seat of each pair of seat units of the first plurality of pairs of seat units, the seat unit pair axis being oriented parallel with the longitudinal axis of the aircraft cabin.

4. The aircraft cabin according to claim 1, further comprising a second plurality of pairs of seat units positioned along the first aisle on a second, opposite side of the first aisle, wherein the second plurality of pairs of seat units is substantially identical to the first plurality of pairs of seat units.

5. The aircraft cabin according to claim 1, further comprising a second aisle and a second plurality of pairs of seat units, wherein the second plurality of pairs of seat units is positioned along a side of the second aisle, the second plurality of pairs of seat units is substantially identical to the first plurality of pairs of seat units, and the first aisle and the second aisle are positioned between the first plurality of pairs of seat units and the second plurality of pairs of seat units.

6. The aircraft cabin according to claim 5, wherein a third plurality of pairs of seat units is positioned between the first aisle and the second aisle, the third plurality of pairs of seat units being positioned along one of the first aisle or the second aisle, each pair of the third plurality of pairs of seat units comprising a non-aisle seat unit and an aisle seat unit,
   wherein the aisle seat unit comprises an aisle seat and an aisle footwell and the non-aisle seat unit comprises a non-aisle seat and a non-aisle footwell,
   wherein a width of the non-aisle footwell is less than a width of the non-aisle seat, and
   wherein the aisle seat unit and non-aisle seat unit are positioned with respect to one another such that:
   the aisle seat faces towards the first end of the cabin and has direct access to the one of the first or second aisles,
   the non-aisle seat faces towards a second, opposite end of the cabin,
   the aisle seat is positioned adjacent the non-aisle footwell such that no access path is provided between the aisle seat and the non-aisle footwell, and
   the aisle seat unit is oriented at an angle with respect to the non-aisle seat unit such that the non-aisle seat and the aisle footwell are spaced apart to provide the non-aisle seat unit with an aisle access path between the non-aisle seat and the aisle footwell.

7. The aircraft cabin according to claim 6, wherein an aisle seat unit angle of the third plurality of pairs of seat units is different to an aisle seat unit angle of the first plurality of pairs of seat units.

8. The aircraft cabin according to claim 6, wherein a non-aisle seat unit angle of the third plurality of pairs of seat units is different to a non-aisle seat unit angle of the first plurality of pairs of seat units.

9. The aircraft cabin according to claim 6, comprising a plurality of sets of three seat units, each set of three seat units comprising a first seat unit, a second seat unit, and a third seat unit, wherein the first and second seat units are formed by a pair of seat units of the third plurality of pairs of seat units.

10. The aircraft cabin according to claim 9, wherein the third seat unit is an aisle seat unit comprising an aisle seat and an aisle footwell, and wherein the third seat unit is positioned with respect to the first and second seat units such that:
   - the aisle seat of the third seat unit faces towards the first end of the cabin and has direct access to the other of the first and second aisles,
   - the aisle seat of the third seat unit is positioned directly adjacent the non-aisle footwell of the second seat unit, and
   - the aisle footwell of the third seat unit is positioned directly adjacent the non-aisle seat of the second seat unit.

11. The aircraft cabin according to claim 10 wherein the aisle seat of the third seat unit faces in a direction defining a third seat unit axis, wherein the third seat unit axis is oriented at an angle of between 5 and 8 degrees to the longitudinal axis of the aircraft cabin.

12. A kit of parts suitable for forming an aircraft cabin according to claim 1.

* * * * *